United States Patent [19]

Elkins

[11] Patent Number: 5,572,954
[45] Date of Patent: Nov. 12, 1996

[54] APPARATUS FOR CONTROLLED GRAZING AND PASTURE IRRIGATION

[76] Inventor: Gerald A. Elkins, HCR 2, Box 53, Hart, Tex. 79043

[21] Appl. No.: 324,926

[22] Filed: Oct. 18, 1994

[51] Int. Cl.6 ..................................................... A01K 3/00
[52] U.S. Cl. ............................ 119/502; 119/510; 119/518
[58] Field of Search ............................. 119/20, 843, 701, 119/422, 502, 510, 512, 518; 239/161, 166, 163, 728; 256/10, 23

[56] References Cited

U.S. PATENT DOCUMENTS

| | | | |
|---|---|---|---|
| 3,302,616 | 2/1967 | Bradshaw | 119/20 |
| 3,599,664 | 8/1971 | Hotchkiss et al. | 137/344 |
| 3,724,758 | 4/1973 | Fizmaurice | 239/251 |
| 3,902,668 | 9/1975 | Daugherty et al. | 239/177 |
| 3,912,170 | 10/1975 | Reinke | 239/177 |
| 3,972,307 | 8/1976 | Marseillan | 119/20 |
| 3,983,898 | 10/1976 | Zimmerer et al. | 137/344 |
| 4,006,714 | 2/1977 | Goosen | 119/20 |
| 4,275,685 | 6/1981 | Hopkins | 119/843 |
| 4,341,181 | 7/1982 | Fair | 119/20 |
| 4,397,421 | 9/1983 | Schram | 239/177 |
| 4,721,061 | 1/1988 | McNatt | 119/20 |

FOREIGN PATENT DOCUMENTS

| | | | |
|---|---|---|---|
| 2621345 | 4/1989 | France | 119/843 |

*Primary Examiner*—Todd E. Manahan
*Attorney, Agent, or Firm*—Novak Druce Reynolds Burt

[57] ABSTRACT

Two center-pivot irrigation systems utilized for controlled grazing. A preceding and succeeding center-pivot system contain electrified fences for containing herds and controlling the extent of their grazing. The preceding system contains water tanks for the herd and the succeeding system irrigates the pasture. Together the systems eliminate overgrazing and improve the quality of the herd.

15 Claims, 3 Drawing Sheets

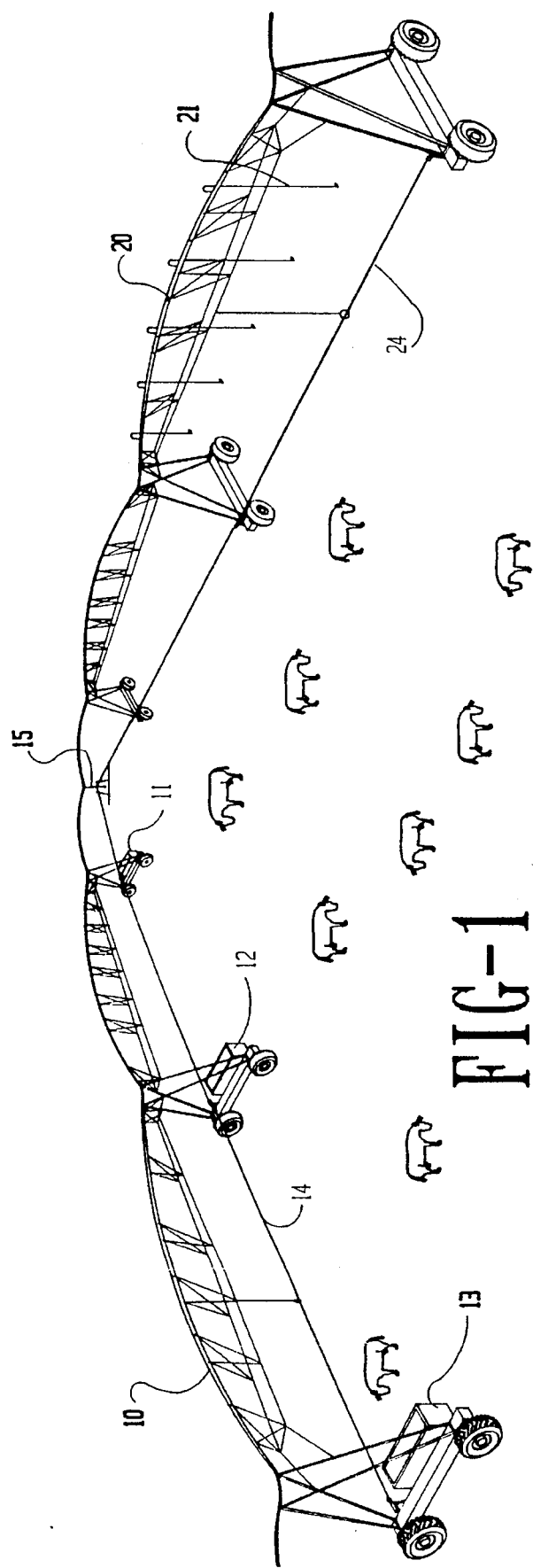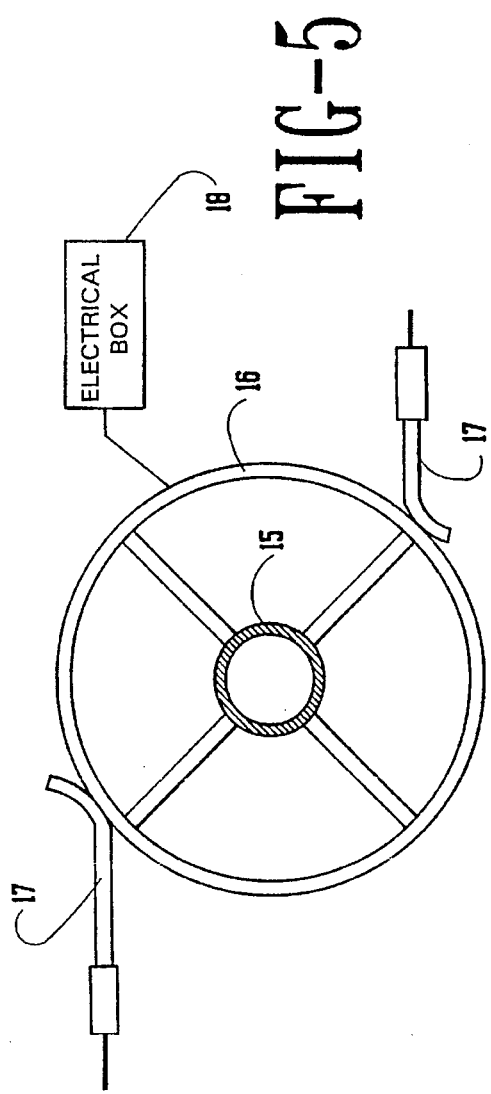

APPARATUS FOR CONTROLLED GRAZING AND PASTURE IRRIGATION

BACKGROUND OF THE INVENTION

1. Field of Invention

This invention relates to a means of managing acreage by use of a center-pivot irrigation system. More specifically, it is directed to an improved, low cost method of controlling grazing consisting of two center-pivot irrigation systems attached at the pivot adjustable to varying angles of separation with both equipped with electric wire for holding in animals, while simultaneously irrigating a crop or pasture.

2. Related Art

Center-pivot irrigation systems have long been used in many areas where irrigation is either necessary or desired to increase crop production. These center-pivot irrigation systems have excelled due to their simplicity of operation and convenient one-pivot water supply, and have yielded quite substantial increases in crop production.

An early effort at a center pivot irrigation apparatus is found in U.S. Pat. No. 3,599,664 to Hotchkiss et al. This patent reveals a center pivot irrigation system mounted on wheels with flexible joints between distributing pipe sections and means for controlling speed or movement of sections based on a signal conveyed by the flexing of the joints.

Another prior effort at an irrigation system is found in U.S. Pat. No. 3,724,728 to Fizmaurice. This patent reveals a boom type irrigation system permanently positioned in a field to be irrigated with no wheels for movement.

A prior art effort to modify a center pivot irrigation system to provide for a means of irrigating closer to the edges of a square field is found in U.S. Pat. No. 3,902,668 to Daugherty et al. This patent adds to prior an by revealing a boom extension to a center pivot irrigation system guided along a path defined by an electrical conductor.

Other pertinent examples of modifications to a center pivot irrigation system are found in U.S. Pat. Nos. 3,912,170 to Reinke, 3,983,898 to Zimmerer et al., and 4,397,421 to Schram. Reinke's patent reveals a lightweight substantially all-aluminum sprinkler system capable of withstanding great variations in temperature. Zimmerer's patent reveals a modification to the couplings between the individual pipe sections of a center pivot irrigation system. Schram's patent illustrates a means of applying liquid chemical to a field utilizing a center pivot irrigation system.

None of the above mentioned prior art utilize a center-pivot irrigation system for controlled grazing. Farmers have allowed grazing in a field where a single center-pivot irrigation system is used. However, management of the herd is labor intensive in such an environment, with over-grazing frequently occurring. This is because the animals tend to concentrate in one part of a pasture until the food supply in that area has been totally consumed, or the plants have been destroyed. Often the animals will eat so heavily that the plants themselves will be destroyed. Even if they move onto another area of the pasture, this results in the area where they have been not recovering adequately. In addition, there is the hidden costs of labor from having to move fences. With the invention described herein, the issue of having to move fences is minimized.

A prior effort to design a means so that livestock do not graze in one area for an extended period of time is found in U.S. Pat. No. 4,721,061 to McNatt. While meeting the objective of avoiding having animals graze in one part of a pasture for an extended period of time, the McNatt patent does so through the use of a labyrinthine path set up so that the rings are of approximate equal square footage. Such a setup would require a great amount of manpower to establish.

Though the above mentioned prior arts have individual qualifies and characteristics, including being helpful in crop production, they can be improved to provide a center-pivot irrigation system that requires minimal setup, minimal labor and thereby greater marketability, as well as at the same time help reduce or eliminate erosion due to overgrazing. Most ranchers understand the need of continuous inspection of their herds and frequent movement of their herds from one pasture to another. The marketing success of an apparatus for controlled grazing requires that the device minimizes labor and costs while maintaining or improving the marketable quality of the animal. The devices referred to by the prior art either do not address the aspects of controlled grazing, or do not truly minimize setup and labor; therefore, the devices tend to be less marketable for the purposes of controlled grazing.

SUMMARY OF THE INVENTION

To achieve such improvements, the invention comprises an apparatus for controlled grazing which includes a set of paired center-pivot irrigation systems, one preceding and one succeeding, in a pasture bounded at its perimeter by a stationary electric fence. Both systems are joined together at the same center pivot and proceed together in the same direction around the pasture thereby regulating the amount of pasture available for gazing.

The angle of separation of the systems can be varied and regulated based on the size of the herd to be controlled. By controlling the speed of each of the two arms of the pair with a local controller in a manner consistent with known designs for center-pivot irrigation systems, the angle of separation may be varied or maintained constant as each arm rotates independently about the center pivot. The control box would control each system individually to reduce or increase the angle of separation by speeding up or slowing down the movement of one of the systems. The degree of separation would be regulated by limit switches that monitor whether the systems are too close together or too far apart. Tripping a switch would signal the control box to stop both systems. By doing so, the limit switches would serve as a safety device, preventing the systems from damaging each other and the animals.

The preceding system would perhaps employ water tanks supplied by a water line from the center pivot. In addition, other tanks would perhaps be employed for supplying minerals such as salt and perhaps feed.

The succeeding system would perhaps employ a means of irrigation consistent with today's center-pivot irrigation systems. The sprinkler heads would be such that they spray opposite the direction of travel of the systems. Both systems would employ electric wire for fencing in the animals. Together with the stationary fence at the perimeter the animals would be contained within an area of the pasture specified by the rancher.

Accordingly, the objectives of this invention are to provide, inter alia,

1. An apparatus for controlled grazing and pasture irrigation which includes a pair of center-pivot irrigation systems which when joined together at the same pivot provides a means of reducing the amount of manpower required to manage a herd.

2. An apparatus for controlled grazing and pasture irrigation which includes a pair of center-pivot irrigation systems which when joined together at the same pivot provides a means of lowering the costs required to manage a herd.

3. An apparatus for controlled grazing and pasture irrigation which includes a pair of center-pivot irrigation systems which when joined together at the same pivot can be adjusted according to the size of the herd to be managed.

4. An apparatus for controlled grazing and pasture irrigation which includes a pair of center-pivot irrigation systems which when joined together at the same pivot provides a means of reducing or possibly even eliminating erosion due to overgrazing.

These and other objects and advantages of the invention will become more apparent to those skilled in the art by reference to the following specification, drawings and attendant claims.

BRIEF DESCRIPTION OF THE DRAWING

The manner in which these objectives and other desirable characteristics can be obtained is explained in the following description and attached drawings in which:

FIG. 1 is a side elevational view of the system of the invention;

FIG. 5 is a top view of the ends of the two electrified wires of the system of the invention illustrating the means of electrifying the fences.

DETAILED DESCRIPTION OF THE INVENTION

Figure 2:
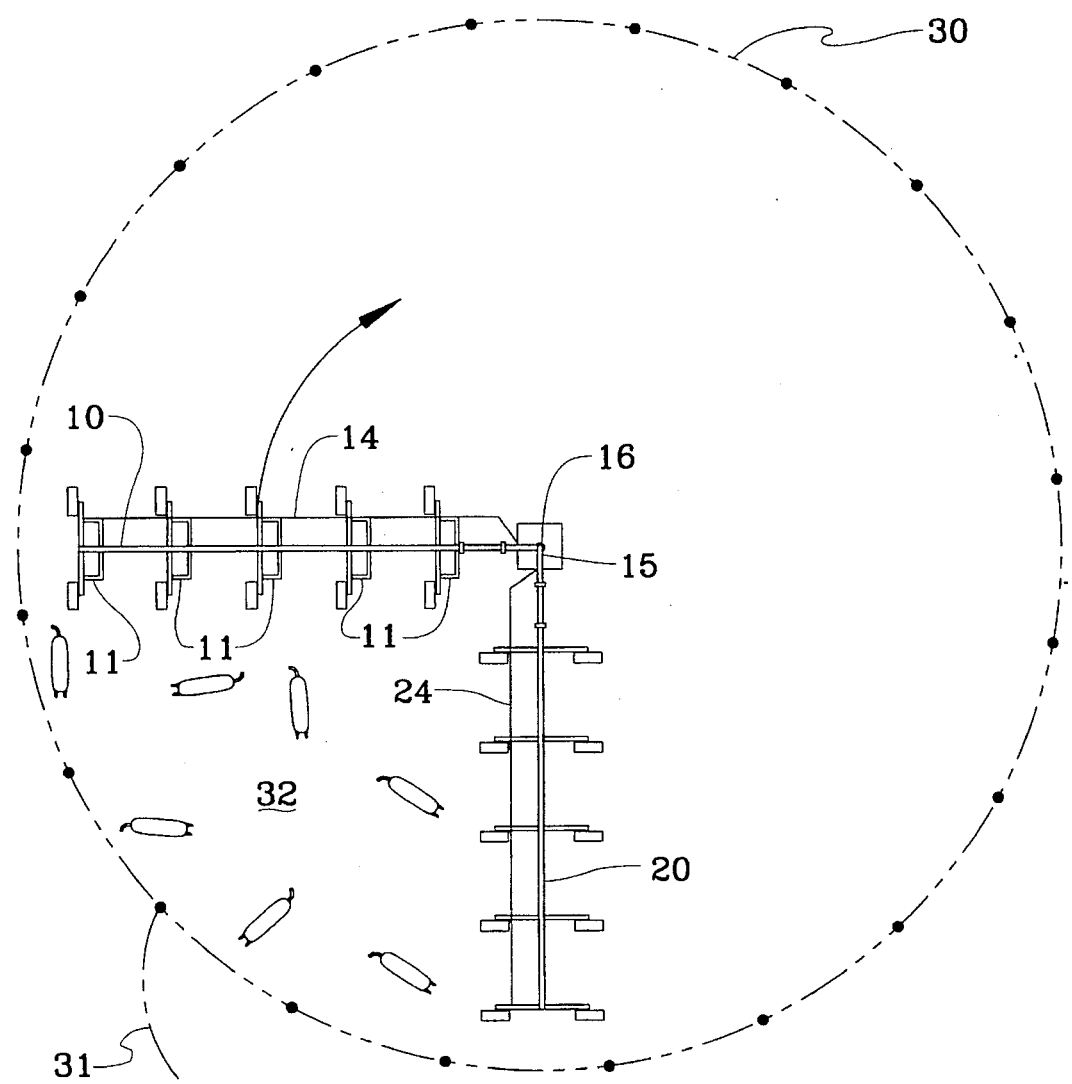
FIG. 2 is, in effect, an aerial view of the system of the invention.

The preferred embodiment of the invention is illustrated in FIGS. 1 through 4. FIG. 1 is a side elevational view of the preceding 10 and succeeding 20 center-pivot irrigation systems. Both the preceding 10 and succeeding 20 systems rotate about a center-pivot 15 which is detailed below in connection with FIG. 4. Referring to FIG. 1, the preceding system 10 includes a plurality of tanks 11, 12, and 13 attached to and carried by the preceding system 10. The tanks may be kept filled by float regulators. A stationary fence 30 is illustrated in FIG. 2. The stationary fence 30, together with the radial arms of the preceding system 10 and succeeding system 20 define a pie-shaped confining area 32 within which grazing takes place as the confining area 32 moves about the center pivot 15. It is contemplated that the stationary fence 30 may be electrified in at least one embodiment. Furthermore, one or more gates 31 may be located along the length of the stationary fence 30 that permit animal access into and out of the confined area.

The preceding 10 and succeeding 20 center-pivot irrigation systems carry electrified wire 14 and 24 for controlling the movement of the animals. The succeeding electrified wire 24 gently drives the animals forwardly around the pasture, and the preceding electrified wire 14 functions to contain the animals within the area of the pasture designated by the rancher. By continually moving forward the herd is not kept in one area too long thus avoiding overgrazing. It should be understood that the speed of movement by the center-pivot irrigation systems 10 and 20 may be varied to control the length of time of grazing in an area of the pasture.

A means of electrifying the fence 14 and 24 is illustrated in FIG. 5. A ring 16 is mounted to the center pivot 15 and kept hot by an electric box 18. Both fences contact the ring 16 with brushes 17 similar to those found on bumper cars found at amusement parks. By this means the fences are continually kept hot as they rotate about the pasture. In addition, the ring could also be supplied electricity through the center pivot 15 system itself.

Figure 3:
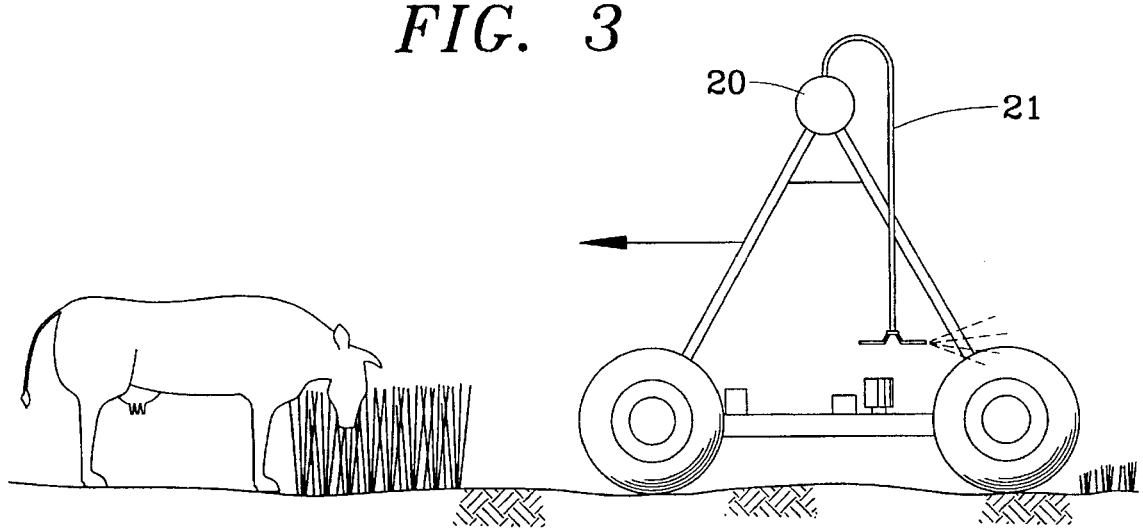
FIG. 3 is a side view of the succeeding center-pivot irrigation system illustrating the irrigation of the field with respect to the movement of the irrigation system.

FIG. 3 is a side view of the succeeding center-pivot irrigation system 20 illustrating irrigation of the field. That portion of the pasture just grazed is irrigated by a series of sprinklers 21 provided by the succeeding system 20. Water should be sprayed opposite the direction of movement to avoid trafficking by the animals on wet ground. Time should be allowed for drying before permitting grazing on the ground irrigated in order reduce damage to the pasture.

By using the invention described herein, pasture foliage should be maintained, and the market weights of animals increased thereby resulting in higher profits per acre. In addition, less acreage would be necessary than that required by conventional pasturing methods.

FIG. 2 is a top elevational view of the apparatus. As illustrated, the preceding 10 and succeeding 20 systems are separated by an approximate 90 degree angle of separation. However, it should be understood that this angle of separation can be varied depending upon the number of animals to be contained.

Figure 4:
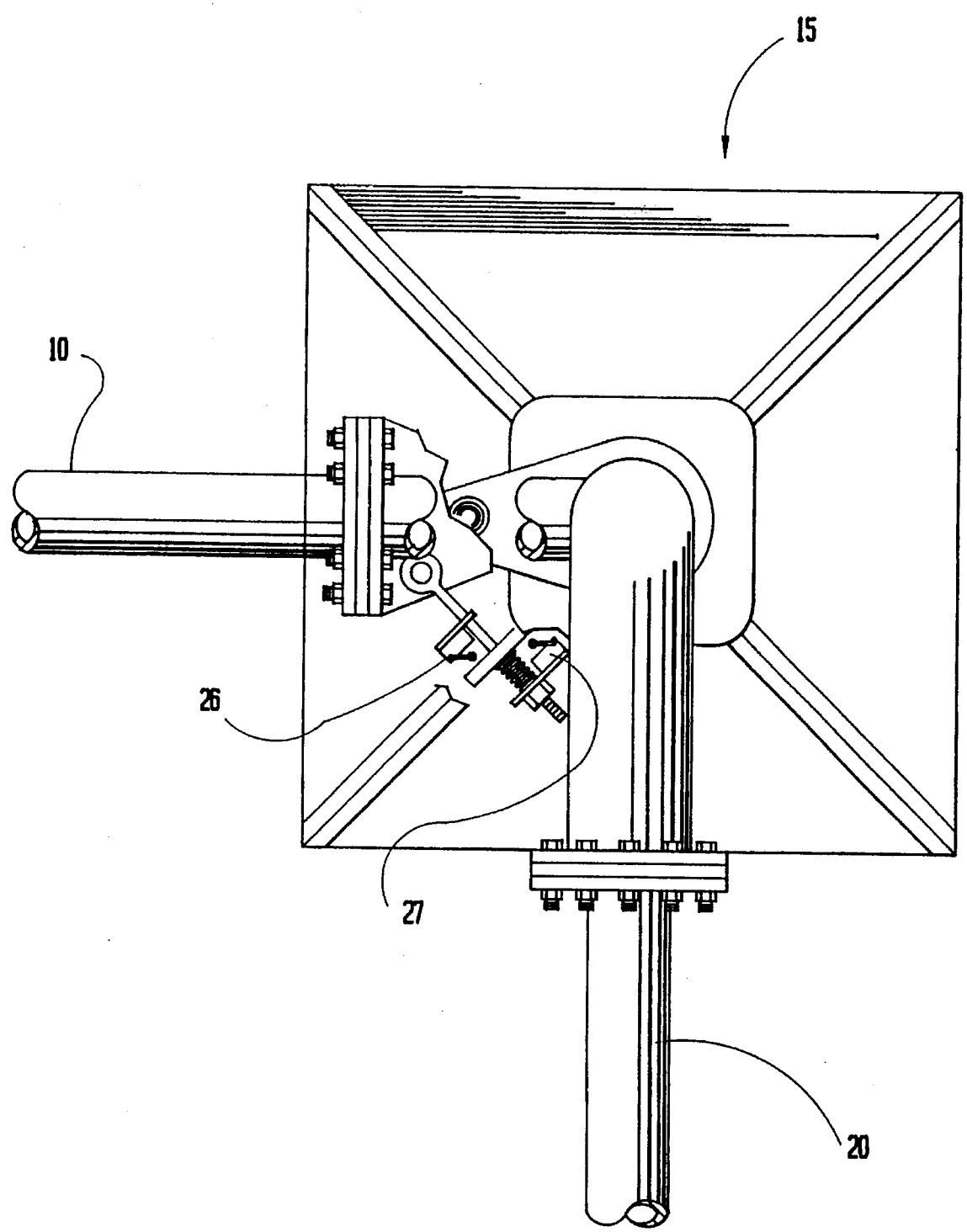
FIG. 4 is a top view of the connection of the two center-pivot irrigation systems.

FIG. 4 illustrates a top elevational view of the connection of the two center-pivot irrigation systems 10 and 20. The end of the preceding system 10 is attached to the succeeding system 20 by means of a ball-and-socket joint which allows for up to 180 degrees of separation of the two systems 10 and 20 at the center pivot 15.

The angle of separation is set by the rancher initially when deciding upon the amount of pasture to be utilized. By using the control box provided in present systems, the rancher moves the preceding system 10 to the desired angle. Once set, the control box is used by the rancher to initiate movement of both systems at the desired speed. By controlling the angle of separation and speed of system movement, it is possible for the rancher to control both the amount and time of grazing in a particular area.

Limit switches 26 and 27 regulate the degree of separation of the systems 10 and 20. As the systems come closer together than the rancher desires, a limit switch 27 is tripped sending a signal to the center pivot control system to shut down both systems. Likewise, should the systems separate further than desired, a limit switch 26 is tripped sending a signal to the center pivot control system to shut down both systems. In shutting down the systems the limit switches 26 and 27 function as safety devices. By doing so, should one system lag behind or speed ahead of the other, stopping both systems prevents harm to both equipment and animals.

While there has been disclosed effective and efficient embodiments of the invention using specific terms, it should be understood that the invention is not limited to such embodiments as there might be changes made in the arrangement, disposition, and form of the parts without departing from the principle of the present invention as comprehended within the scope of the accompanying claims.

What is claimed is:

1. An apparatus for controlled grazing and irrigation, comprising:

a center-pivot having a preceding radial arm and a succeeding radial arm, each of said radial arms being independently rotatably coupled to said center-pivot for revolution thereabout;

a variable spacing angle being defined between said preceding radial arm and said succeeding radial arm, said spacing angle being alterable by varying at least one of said arm's speed of rotation about said center-pivot; and a stationary fence located about said center-pivot and said radial arms thereby defining a pie-shaped confining area within said stationary fence and said radial arms.

2. The apparatus as recited in claim 1, said apparatus further comprising electrified wiring coupled to said preceding and said succeeding arms thereby electrifying at least a portion of a boundary about said confining area.

3. The apparatus as recited in claim 1, said apparatus further comprising controller for governing the rotation of each of said arms.

4. The apparatus as recited in claim 1, said apparatus further comprising a first limit switch for detecting when an expansion limit of said separating angle has been exceeded.

5. The apparatus as recited in claim 1, said apparatus further comprising a second limit switch for detecting when a contraction limit of said separating angle has been exceeded.

6. The apparatus as recited in claim 1, said apparatus further comprising water tanks connected to said preceding arm thereby providing water for the grazing animals.

7. A method of controlling animal grazing about a center-pivot irrigation system, said method comprising the steps of:

coupling a plurality of radial arms to a center-pivot for rotation about said center-pivot, establishing a spacing angle between a pair of said radial arms within which a section of pasture is defined for animal grazing;

independently rotating each of said radial arms about said center-pivot so that the area of the grazing section of pasture defined therebetween is variably adjustable by varying the spacing angle between the paired arms; and locating a circular stationary fence about said center-pivot and said radial arms thereby defining a pie-shaped grazing area bounded by said stationary fence and said radial arms.

8. The method of controlling animal grazing as recited in claim 7 further comprising the step of:

electrifying wiring coupled to said radial arms thereby assisting in containing animals within the section of the pasture to be grazed.

9. The method of controlling animal grazing as recited in claim 7 further comprising the steps of:

halting rotation of said radial arms about said center-pivot when said spacing angle exceeds a predefined limit.

10. A management system for controlling animal grazing about a center-pivot irrigation system, said management system comprising:

an irrigation system having a center-pivot and a plurality of radially oriented elongate watering pipes extending therefrom, said elongate watering pipes comprising at least a preceding pipe and a succeeding pipe having a variable spacing angle therebetween, said spacing angle establishing a pie-shaped confining area for grazing animals bounded by said pipes; and each of said pipes being coupled to said center-pivot for independent rotation thereabout, said pipes being individually controlled with respect to speed of rotation about said center-pivot so that said spacing angle may be varied to increase and decrease said confining area.

11. The management system for controlling animal grazing about a center-pivot irrigation system as recited in claim 10, said management system further comprising electrified wiring coupled to said preceding and succeeding pipes thereby electrifying at least a portion of a boundary about said confining area.

12. The management system for controlling animal grazing about a center-pivot irrigation system as recited in claim 10, said management system further comprising a controller for governing the rotation of each of said elongate watering pipes.

13. The management system for controlling animal grazing about a center-pivot irrigation system as recited in claim 10, said management system further comprising a first limit switch for detecting when an expansion limit of said separating angle has been exceeded.

14. The management system for controlling animal grazing about a center-pivot irrigation system as recited in claim 10, said management system further comprising a second limit switch for detecting when a contraction limit of said separating angle has been exceeded.

15. The management system for controlling animal grazing about a center-pivot irrigation system as recited in claim 10, said management system further comprising water tanks connected to said preceding pipe thereby providing water for the grazing animals.

* * * * *